Feb. 16, 1960 W. P. LEAR 2,924,885
AIRCRAFT INDICATING INSTRUMENT AND SYSTEM
Filed March 28, 1955 2 Sheets-Sheet 1

INVENTOR.
WILLIAM P. LEAR,
BY Perry E. Turner
AGENT.

Feb. 16, 1960 W. P. LEAR 2,924,885
AIRCRAFT INDICATING INSTRUMENT AND SYSTEM
Filed March 28, 1955 2 Sheets-Sheet 2

INVENTOR.
WILLIAM P. LEAR,
BY
Perry E. Turner
AGENT

United States Patent Office 2,924,885
Patented Feb. 16, 1960

2,924,885
AIRCRAFT INDICATING INSTRUMENT AND SYSTEM

William P. Lear, Pacific Palisades, Calif., assignor to Lear, Incorporated, Santa Monica, Calif.

Application March 28, 1955, Serial No. 497,204

1 Claim. (Cl. 33—204)

This invention relates to flight indicating instruments for aircraft, and more particularly to an arrangement wherein a single instrument is adapted to give complete information of the attitude of an aircraft and which can be utilized to facilitate natural flight.

Prior to the development of this invention, separate instruments have been provided in an aircraft to give heading and attitude indications. From attitude indicating instruments the pilot must make mental adjustments to determine the instant attitude of the aircraft; such mental adjustments can be made rapidly only by pilots having considerable training and experience. Where coordinated turns are attempted and the pilot banks the plane in the maneuver necessary to turn to a new heading, he must keep shifting his attention between the heading and attitude indicators to ascertain how rapidly the new heading is being approached and when to level out. In this latter connection, the operation of the aircraft controls must be synchronized in order to move the plane smoothly from one heading to another, and here also, the training and experience of the particular pilot largely determines how smoothly the change in heading can be accomplished.

It is therefore an object of this invention to provide a flight instrumentation system having a single instrument with which a pilot can determine the attitude of an aircraft at a glance without having to make extensive mental adjustments.

It is another object of this invention to provide, for a flight instrumentation system, a single indicating instrument which will permit a pilot to determine the attitude of an aircraft at a glance and to learn to change headings more easily than is possible for an experienced pilot using separate indicators.

It is yet another object of this invention to provide a single indicator which can be used to provide both heading and attitude information of an aircraft, which comprises a minimum number of component parts of simple design, and which is highly accurate.

The above and other objects and advantages of this invention will become apparent from the following description taken in conjunction with the accompanying drawings, in which different embodiments of the invention are illustrated by way of example. The scope of the invention is pointed out in the appended claim. Referring to the drawings, Fig. 1 is a view of the face of an indicating instrument to provide both roll attitude and heading information of an aircraft, in accordance with this invention;

Briefly, in accordance with one embodiment of this invention, the indicator employs a pointer or needle in the form of the silhouette of the aircraft as it is seen from the tail. This needle is pivoted for rotation relative to the instrument housing and to a compass indicator card. The compass card is adapted for rotation, as under the influence of signals from a directional gyroscope, to indicate changes in heading, and the silhouette needle is adapted to rotate to indicate the roll attitude of the aircraft. As the aircraft changes heading, the silhouette needle is disposed from a "wings-level" position to accurately represent the roll attitude of the plane, and the compass card rotates toward the new heading. As the new heading indication on the card approaches the fin 42 of the silhouette needle, the pilot may begin to right the aircraft. Thereafter, leveling off may be continued while keeping the fin lined up with the new heading. In this manner, a new heading can be approached asymptotically.

Figure 1:
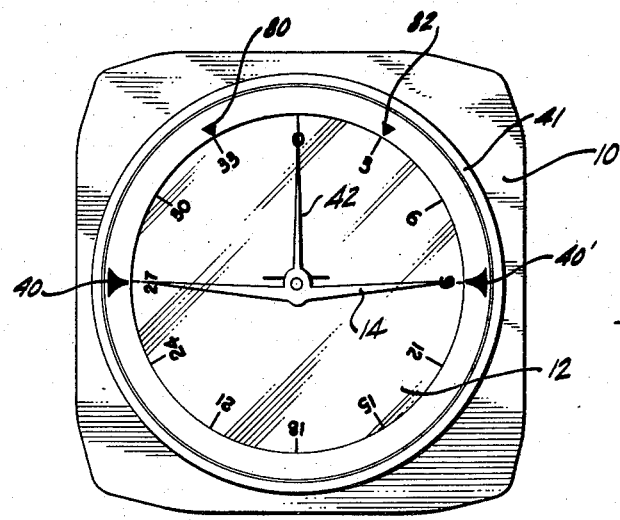
Figure 2:
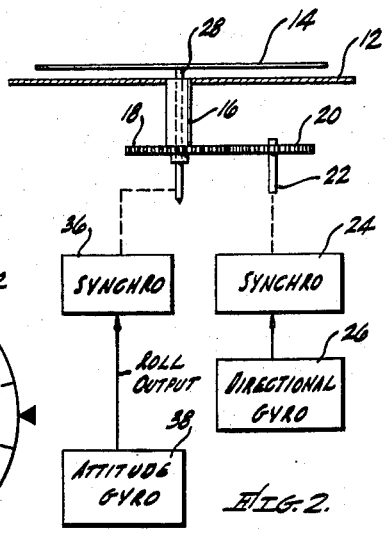
Fig. 2 is a plan view of certain parts of the indicator of Fig. 1, together with a block diagram arrangement for a natural flight instrumentation system, further in accordance with this invention.

Referring to Figs. 1 and 2, an indicator instrument in accordance with this invention is supported in a housing, generally indicated at 10, and comprises a compass card 12 which bears graduated markings to represent bearing information. A needle 14 in the shape of the silhouette of the aircraft as seen from the tail is supported for rotation in front of compass card 12.

As seen in Fig. 2, compass card 12 is supported on a shaft 16 to which a toothed gear 18 is fixed. A gear 20 having teeth which mesh with the teeth of gear 18 is supported on a shaft 22 which is mechanically coupled to an actuating device, indicated as synchro 24. Synchro 24 is coupled to a directional gyro 26 to rotate shaft 22 and gear 20 in accordance with signals received from directional gyro 26.

Needle 14 is supported on a shaft 28 which extends through a concentric shaft 16 and is driven by a synchro 36. Synchro 36 is adapted to receive roll output signals from an attitude gyro 38 to rotate needle 14 in accordance with the signals from gyro 38.

The mechanical arrangement shown in Fig. 2 for effecting rotation of compass card 12 and needle 14 is for the purpose of illustration only. It will be understood, of course, that suitable provisions would be made to support shafts 16 and 28 for smooth rotation with a minimum of friction. To this end, conventional means well known in the art could be employed. The synchro systems likewise may be any conventional devices, suitable for use as electro-mechanical converters, to pick off signals from a gyroscope and provide a representative rotation of an output shaft.

As indicated in Fig. 2, signals from the attitude gyro represent the position of the aircraft with respect to the roll axis of gyro 38. When the aircraft is in level flight, a zero or reference signal output from gyro 38 is reflected through synchro 36 to shaft 28 and needle 14 to cause the needle to assume a "wings-level" position, which may be observed by noting that the wing tips of needle 14 are lined up with fixed marker points 40, 40' (Fig. 1) provided on the mask 41. During level flight, the fin 42 of needle 14 is in line with the bearing indication on compass card 12 which indicates the heading of the aircraft.

Figure 3A:
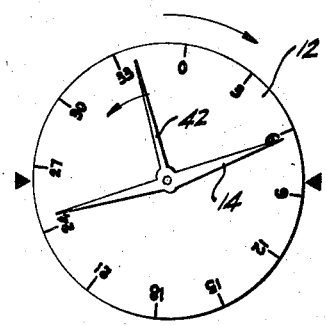
Figs. 3a, 3b and 3c illustrate the operation of the indicator on Fig. 1, as controlled by the system of Fig. 2, during change in heading of an aircraft.
Figure 3B:
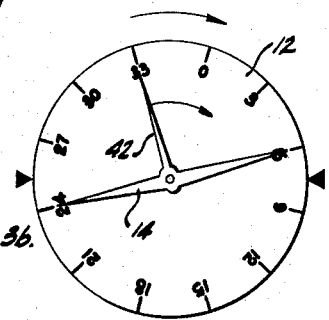

The operation of the above described indicator and system will now be further explained in connection with Figs. 3a, 3b and 3c when the aircraft is banked to move to a new heading. It is assumed that the aircraft was originally flying to a heading indicated in Fig. 1, i.e., 360°, and it is desired to move the aircraft to a new heading of 330°. To accomplish this maneuver, the aircraft is banked to the left. As the aircraft turns, directional gyro 26 develops signals representing the change in heading and synchro 24 causes compass card 12 to rotate in synchronization. In other words, compass card 12 rotates clockwise, as indicated in Fig. 3a. The attitude gyro 38 develops signals which represent the roll attitude of the aircraft, and these signals are converted into mechanical movement by synchro 36 to cause needle 14 to assume the same roll attitude. This means that needle 14 rotates to the left or counter-clockwise, as indicated in Fig. 3a.

As the pilot observes the closing of the fin 42 of needle 14 upon the new heading of 330°, he may begin to reduce the roll attitude of the plane, so that when the fin 42 of needle 14 is in line with the new bearing indication, he may begin levelling out while maintaining the fin 42 in line with the new bearing indication. While thus levelling out, the signals from the attitude gyro will be reduced in magnitude, whereby synchro 36 permits needle 14 to return toward the "wings-level" position. During this portion of the maneuver, compass card 12 and needle 14 are rotating in the same direction, i.e., clockwise in Fig. 3b.

Figure 3C:
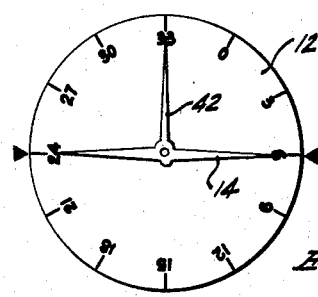

By continuing to fly the fin 42 of the needle 14 to the new bearing indication as explained above, the pilot will maneuver the aircraft to a "wings-level" position on the new heading when the wing tips of needle 14 are at a "wings-level" position, as illustrated in Fig. 3c.

Figure 4:
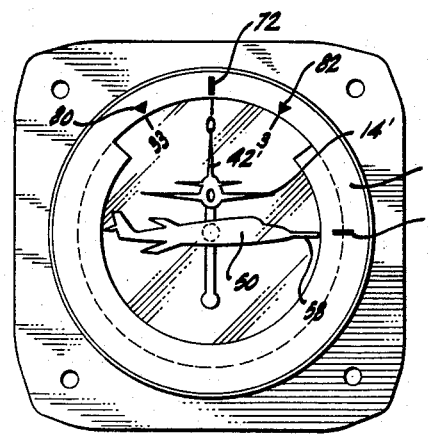
Fig. 4 is a front view, similar to Fig. 1, to illustrate a second embodiment of the invention with which roll attitude, pitch attitude and heading of an aircraft are presented.
Figure 5:
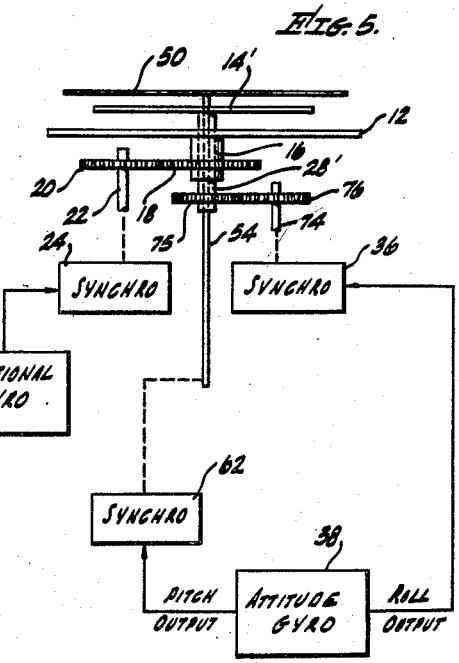
Fig. 5 is a combined plan view and block diagram, similar to Fig. 2, to illustrate the operation of the instrument of Fig. 4.

An indicator and system to give pitch attitude information, along with roll attitude and heading information, is illustrated in Figs. 4 and 5. Referring to Figs. 4 and 5, two silhouette needles 50 and 14' are mounted for relative rotation with respect to each other and to compass card 12. Needle 50 is in the shape of the profile of the aircraft and is mounted on a shaft 54 which extends through shafts 16 and a shaft 28' on which needle 14' is mounted. The mask 41' is inscribed on the right, as indicated, with a fixed marker point 56, and the nose end 58 of needle 50 is in line with marker point 56 when the aircraft is in level flight with respect to the pitch axis of the attitude gyro 38. The ability of attitude gyro 38 to develop signals representative of the pitch attitude of the aircraft, as well as its roll attitude, is utilized, and in the manner of synchro 36 previously explained, a synchro 62 is adapted to receive pitch output signals from gyro 38 to rotate shaft 54 and needle 50 in a direction and to an extent which reflects the magnitude and sense of the signals. In this way, needle 50 is caused to take up a position corresponding to the pitch attitude of the aircraft.

Needle 14' is elongated and shaped at one end in the form of the silhouette of the aircraft as seen from the tail, and it is mounted on a shaft 28'. When the aircraft is in wings-level flight, the fin 42' of needle 14' is in line with fixed marker point 72, shown at the top of the instrument in Fig. 4. In the manner previously explained in connection with Fig. 2, synchro 36 positions needle 14' in accordance with the roll output signals from attitude gyro 38, i.e., the roll axis of the aircraft. In Fig. 5, synchro 36 is shown arranged to drive shaft 28' through an output shaft 74 and gears 75, 76.

Figure 6A:
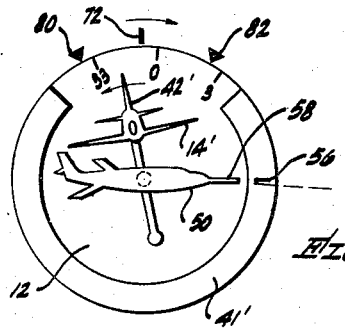
Figs. 6a, 6b and 6c illustrate the movements of the indicating portions of the instrument of Fig. 4, to explain its operation during change in heading by means of the control system of Fig. 5.
Figure 6C:
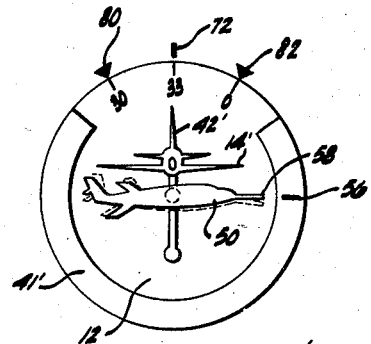
Figure 6B:
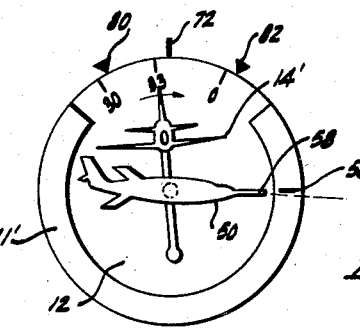

The operation of the combined instrument of Fig. 4 under the control of a system of the type described in connection with Fig. 5 will be more clearly understood by reference to Figs. 6a, 6b and 6c. It will be assumed that the initial heading is 360°, as indicated in Fig. 4, with the aircraft flying level toward such heading. It will also be assumed that it is desired to fly the aircraft to a new heading of 330°. When the aircraft is banked to the left, needle 14' will be caused to rotate to the left to show the roll attitude of the aircraft. The fin 42' of needle 14' is locked on to a new heading of 330° and flown to such heading until both the new heading and the fin 42' are lined up with marker point 72. These positions of needle 14' are shown in Figs. 6a, 6b and 6c to be similar to those for the needle 14 in Figs. 3a, 3b and 3c.

It will be noted that mask 41' covers a substantial portion of the periphery of the compass card 12, leaving only that portion in view which is in the area of the silhouette end of needle 14'. The nose 58 of profile needle 50 is positionable only with reference to marker point 56, not the bearing indications on the compass card. The masking of bearing indications as shown permits the pilot in making a turn to concern himself only with the position of fin 42' with respect to the desired bearing indications, and there is no possibility of confusion by attempts to correlate the position of the nose 58 with any bearing information.

During the change in the heading of the aircraft, the pitch may have changed. For example, a nose-down position may have been assumed, so that upon approaching wings-level position at the new heading the aircraft may actually be changing altitude. Attitude gyro 38 develops signals representative of the pitch attitude and which are converted by synchro 62 into a position of needle 50 to represent this attitude. Needle 50 is shown in Figs. 6a and 6b in a nose-down position, i.e., with the needle 58 angularly spaced slightly clockwise from the marker 56. If this position, indicated in the dotted line in Fig. 6c, is that assumed when the aircraft has arrived at the new heading, the pilot can point the nose of the aircraft upward slightly until a zero or reference signal from attitude gyro 38 causes synchro 62 to position needle 50 so that its pointer end 56 is in line with marker point 58. Alternatively, the pilot may correct for changes in pitch attitude as change in heading progresses, in which event the aircraft may be made to arrive smoothly at the new heading, at level flight with respect to the pitch axis of gyro 38.

It will be apparent that the fixed heading marker point 72 of the indicator of Fig. 4 can be used in the indicator of Fig. 1. Further, fixed marker points similar to points 40, 41 of Fig. 1 could be placed in line with the wing tips of needle 14' in Fig. 4.

An additional aid for the pilot is the provision of roll-limit marker points 80, 82 spaced equally from and on opposite sides of the heading marker point 72. For example, as shown in Fig. 4, the roll-limit points 80, 82 may be placed a desired distance, such as 30°, from heading marker point 72. As the pilot maneuvers to a new heading, he is guided by roll-limit points 80, 82 to limit the roll attitude of his plane to 30° with respect to horizontal; this is accomplished by maneuvering the plane so that fin 42 does not move to the left past roll-limit marker point 80, nor to the right past roll-limit marker point 82.

The instrument of this invention is also suitable for use in conjunction with an ADF (automatic direction finder) system. For example, and as taught in my U.S. Patent 2,321,606, a pointer could be centrally pivoted above compass card 12 and rotated under ADF control to indicate at all times the direction of a nearby ADF radio transmitter.

The indicator and system of this invention is a tremendous aid to blind instrument flight. It is so simply arranged that a novice to instrument flying can adapt himself, in a few minutes' time, to maneuver a plane with a smoothness and skill which is equal to or better than is possible for an experienced pilot who must rely upon separate instruments. Furthermore, a plane on course can be easily maintained in level flight, for the pilot needs only to glance at the instrument to know the plane's attitude, and the plane can be righted as necessary to keep it in level flight.

What is claimed is:

An instrument for indicating heading and pitch and roll attitudes of an aircraft which includes a directional gyroscope and an attitude gyroscope, and means operatively associated with the gyroscopes to provide a first signal representing the heading of the aircraft and second and third signals representing the respective roll and pitch attitudes of the aircraft, said instrument comprising a housing, a flat compass card bearing heading indications adjacent its periphery on one surface, said card being supported for rotation in one end of said housing, a first shaft fixed to and extending from the center of said card into said housing, a flat mask element fixed to said housing adjacent said one surface of said card, said mask element being in the form of an incomplete ring and obscuring from view at least half the heading indications, a fixed marker inscribed on said housing adjacent the periphery of said card, said fixed marker being located intermediate the ends of said incomplete ring adjacent the observable portion of said card, first means to rotate said first shaft in response to the first signal to align the heading indication representing the heading of the aircraft with said fixed marker, a second shaft extending through said first shaft and said card, a first needle including a flat elongated member secured to said second shaft adjacent said one surface, a pointer element secured to one end of said elongated member, said pointer element being shaped in the form of the silhouette of the aircraft as seen from the tail and having an elongated fin portion representing the vertical fin of the tail of the aircraft, said fin portion being of sufficient length that the end thereof is coincident with a heading indication, second means for rotating said second shaft in response to the second signal, said first needle in the absence of the second signal in wings-level flight of the aircraft being positioned with the end of said fin portion adjacent to and aligned with said fixed marker, said first needle in a roll attitude of the aircraft being positioned by said second means with said fin portion displaced from said fixed marker in direction and angular position corresponding to the direction and attitude of the aircraft in roll, a third shaft extending through said second shaft and said first needle, a second needle fixed to said third shaft adjacent the elongated member of said first needle, said second needle being shaped in the form of the silhouette of the aircraft as seen from the side and having an elongated nose portion, a reference mark inscribed on said mask and displaced 90° from said fixed marker, third means rotating said third shaft in response to the third signal, said second needle in the absence of the third signal being positioned with the end of said nose portion adjacent to and aligned with said reference mark, and said second needle being positioned by said third means with said nose portion displaced from said reference mark in direction and angular position corresponding to the direction and attitude of the aircraft in pitch.

References Cited in the file of this patent

UNITED STATES PATENTS

| | | |
|---|---|---|
| 1,856,436 | Schueller | May 3, 1932 |
| 2,080,490 | Kollsman | May 18, 1937 |
| 2,280,797 | Crane | Apr. 28, 1942 |
| 2,323,897 | Carter | July 13, 1943 |
| 2,395,250 | Carlson | Feb. 19, 1946 |
| 2,608,001 | Barkalow | Aug. 26, 1952 |
| 2,823,464 | Snodgrass | Feb. 18, 1958 |

FOREIGN PATENTS

| | | |
|---|---|---|
| 349,026 | Great Britain | May 19, 1931 |
| 553,730 | Great Britain | June 3, 1943 |
| 232,924 | Switzerland | Oct. 2, 1944 |